United States Patent [19]

Tuite

[11] Patent Number: 5,032,293
[45] Date of Patent: Jul. 16, 1991

[54] BASKET FILTER ASSEMBLY WITH INCLINED NOZZLE

[75] Inventor: Gregory D. Tuite, Memphis, Tenn.

[73] Assignee: Buckman Laboratories International, Inc., Memphis, Tenn.

[21] Appl. No.: 355,549

[22] Filed: May 23, 1989

[51] Int. Cl.⁵ .............................................. B01D 29/35
[52] U.S. Cl. ..................... 210/788; 210/241;
210/258; 210/339; 210/452; 210/512.1
[58] Field of Search ............... 210/241, 253, 238, 287,
210/339, 258, 416.5, 448, 450, 452, 455, 451,
512.1, 787, 788; 55/493

[56] References Cited

U.S. PATENT DOCUMENTS

| | | | |
|---|---|---|---|
| 2,865,510 | 12/1958 | Greene | 210/315 |
| 3,349,919 | 10/1967 | Royer et al. | 210/232 |
| 3,764,525 | 10/1973 | Goodman et al. | 210/407 |
| 4,358,371 | 11/1982 | Jameson et al. | 210/415 |
| 4,388,191 | 6/1983 | Morgan | 210/452 |
| 4,613,437 | 9/1986 | Wiand | 210/315 |
| 4,664,798 | 5/1987 | Bergh | 210/452 |
| 4,701,259 | 10/1987 | Rosaen | 210/452 |
| 4,818,398 | 4/1989 | Lott et al. | 210/448 |
| 4,913,815 | 4/1990 | Shulda | 210/452 |

Primary Examiner—Robert A. Dawson
Assistant Examiner—Wanda L. Millard
Attorney, Agent, or Firm—Finnegan, Henderson, Farabow, Garrett & Dunner

[57] ABSTRACT

A filter assembly for filtering a wide size range of impurities from a fluid. The filter assembly comprises a basket having a porous surface of a first average pore size defining an interior space for collecting impurities filtered from a fluid and a filter liner of a second average pore size less than the first average pore size disposed inside the basket for filtering impurities from the fluid. A nozzle is disposed at approximately a 20° angle from the vertical axis for providing an unfiltered fluid to the filter assembly and for increasing the swirling intensity of the fluid therein. The present invention also contemplates a filtration unit including at least one filter assembly described above and a pump for suctioning an unfiltered fluid through the filter assembly so that the pump will draw a filtered fluid.

17 Claims, 4 Drawing Sheets

FIG. 1

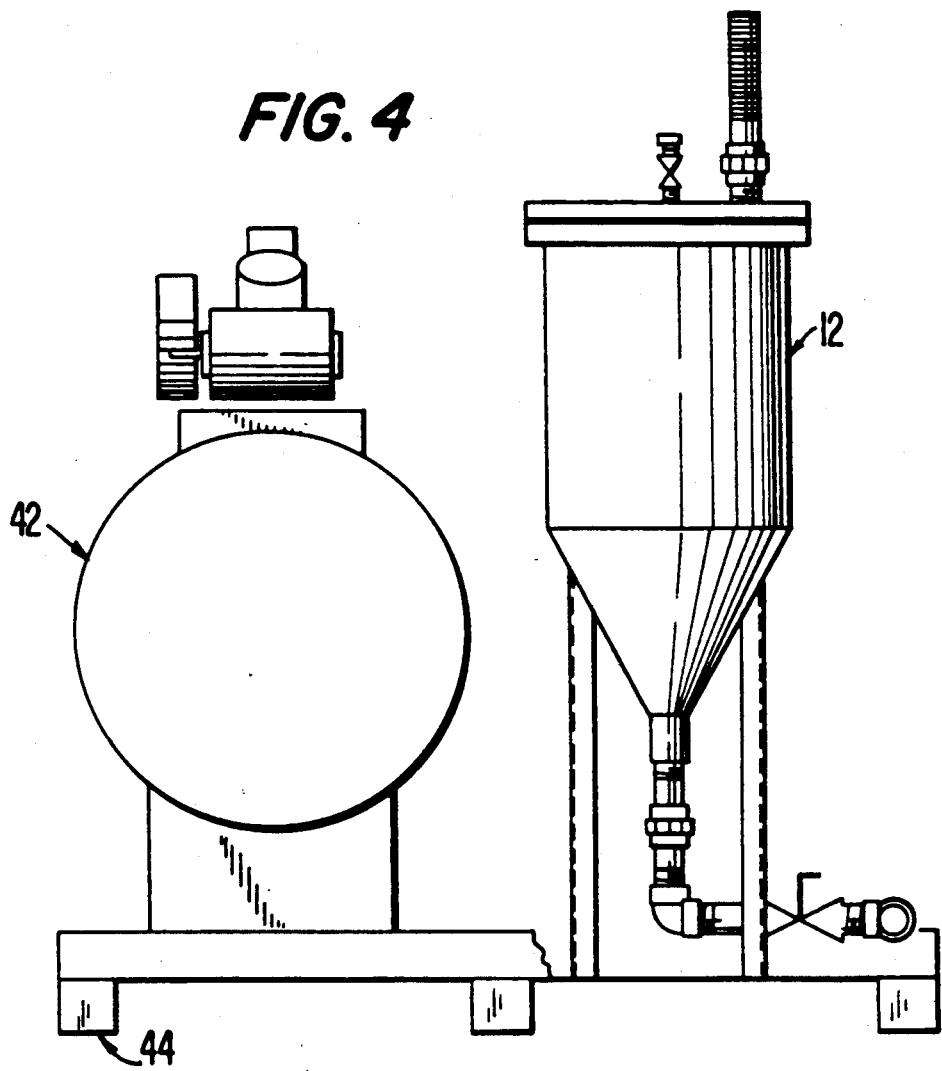

BASKET FILTER ASSEMBLY WITH INCLINED NOZZLE

BACKGROUND OF THE INVENTION

1. Field of the Invention

This invention relates to a filter assembly for removing impurities from a fluid and, more particularly, to a filter assembly for removing a wide size range of impurities from a sawmill dip tank solution.

2. Description of Related Art

In the lumber processing industry, it is typical to treat natural lumber with a wood treatment chemical such as a biocide or a fungicide. These wood treatment chemicals are contained in what is known as a "dip" tank. In addition to treatment chemicals, the dip tank also typically includes water. It is common for debris to accumulate in the bottom of the dip tanks. This debris typically varies in size from two inches to several microns and consists of wood chips, sawdust, plastic banding straps, rocks, dirt and any number of other materials common to a sawmill operation.

Presently, there are two ways to deal with the debris that accumulates in the bottom of sawmill dip tanks. The first method is to allow the debris to accumulate in the dip tank over an extended perod of time, such as one year. Subsequently, the tank is drained and the debris is removed by manual labor. This method, however, is becoming environmentally expensive and undesirable. The debris which has been allowed to accumulate in the dip tank will eventually absorb and adsorb a large amount of the treatment chemical and be classified as a hazardous waste. Disposal of this hazardous waste creates environmental problems.

A second method of dealing with debris that accumulates in sawmill dip tanks is to filter the solution contained in the dip tank. The continuous or frequent filtering of the dip tank solution prevents the debris from absorbing and adsorbing a large amount of treatment chemical and being classified as a hazardous waste. Additionally, the debris removed by regular filtering can be used to form wood composites, such as particle board, or even used in pulp wood digesters. Indeed, filtered debris containing a small amount of treatment chemical (i.e., 1000–30,000 ppm) is a useful component in particle board because it controls the growth of bacteria and fungus.

However, prior art systems of filtering the dip tank solution have problems that severely limit their efficiency. Such systems are known to include a sump pump and a canister type filter that is similar to an automotive oil filter. Unfortunately, sump pumps can only handle finely suspended debris and debris of a larger size, such as ¼ inch, will not pass through the pump. Additionally, the canister type filter does not provide the desired filtering of impurities from the dip tank solution and will repeatedly clog to either prevent effective filtering or to stall the pump.

It is known that a plurality of consecutively arranged filter elements can be used to filter a fluid. For instance, a three stage filtering system consisting of three nested drums lined with blotting paper is disclosed in U.S. Pat. No. 2,865,510. Additionally, U.S. Pat. No. 3,349,919 discloses a system referred to as "series filtering" wherein a plurality of filter elements of different pore size are connected in series and are arranged to receive the fluid to be filtered in an order of decreasing pore size. Such systems, however, do not provide the desired filtering of the solution contained in sawmill dip tanks.

SUMMARY OF THE INVENTION

Accordingly, it is a primary object of this invention to provide a practical and reliable solution for the removal of debris from sawmill dip tanks.

It is a further object of this invention to provide a filter assembly for removing debris from a sawmill dip tank before that debris is classified as hazardous material.

It is still a further object of this invention to provide a filter assembly which can remove particles ranging in size from approximately 2 inches to several microns.

It is yet another object of the present invention to provide a filtration unit that can be used on-site at isolated sawmill locations.

To achieve the foregoing objects and in accordance with the purposes of the invention as embodied and broadly described herein, the filter assembly of this invention comprises a basket having a porous surface defining an interior space for collecting impurities filtered from a fluid, the basket surface having pores of a first average pore size. A filter liner having a second average pore size less than the first average pore size is disposed inside the basket for filtering impurities from the fluid. Additionally, a porous liner of a third average pore size intermediate the first and second average pore sizes can be affixed to the basket surface thereby being disposed between the filter liner and the basket surface. As used herein, the term "average pore size" refers to the size of the openings in the respective elements of the filter assembly. As used herein, the term "porosity" refers to the amount of flow area, i.e. amount of openings, per unit surface area in the respective elements of the filter assembly.

A canister is provided surrounding the basket, filter liner and porous liner. The canister includes straight sidewalls, a sloping bottom that forms a cone shaped cross section and a lid. A nozzle for providing unfiltered fluid to the basket is disposed in the lid and is inclined at approximately a 20° angle with respect to the vertical axis of the canister for increasing the swirling intensity of the fluid inside the canister and the basket.

Further in accordance with the present invention, there is provided a filtration unit for filtering a wide size range of impurities from a fluid such as a dip tank solution used in the lumber processing industry. The filtration unit includes a pump and a filter assembly having a porous basket and a filter liner disposed inside the porous basket, the filter liner having an average pore size less than the average pore size of the basket. The filter assembly is positioned on the suction side of the pump so that the pump draws a filtered fluid and does not become clogged. Preferably, an air driven diaphragm pump is used.

The accompanying drawings, which are incorporated in and constitute a part of this specification, illustrate one embodiment of the invention and together with the description, serve to explain the principles of this invention.

BRIEF DESCRIPTION OF THE DRAWINGS

FIG. 4 is a front elevational view of the filtration unit of the present invention.

DESCRIPTION OF THE PREFERRED EMBODIMENT

Figure 1:
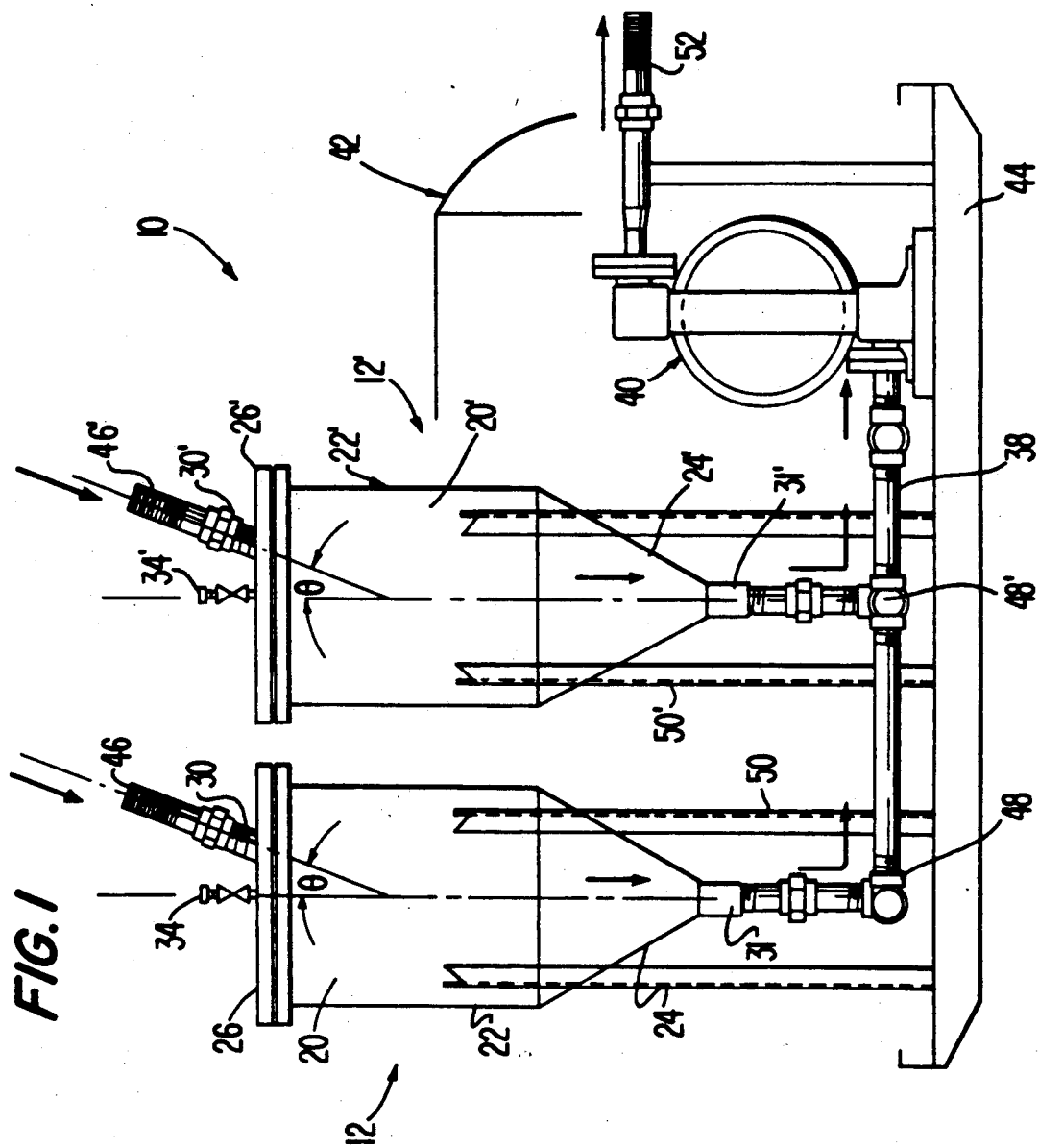
FIG. 1 is a side elevational view of the filtration unit of the present invention.
Figure 2:
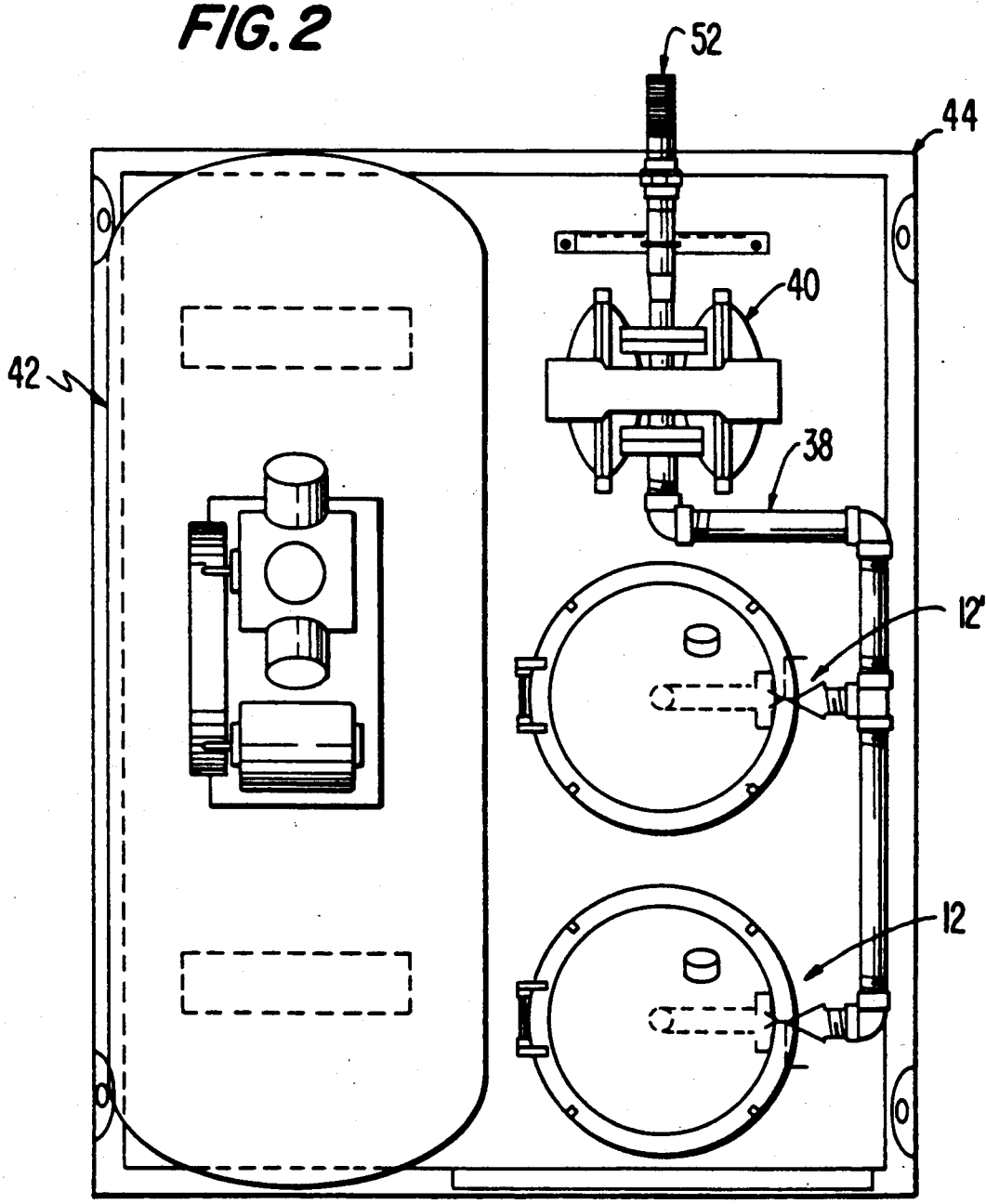
FIG. 2 is a top plan view of the filtration unit of the present invention.
Figure 3:
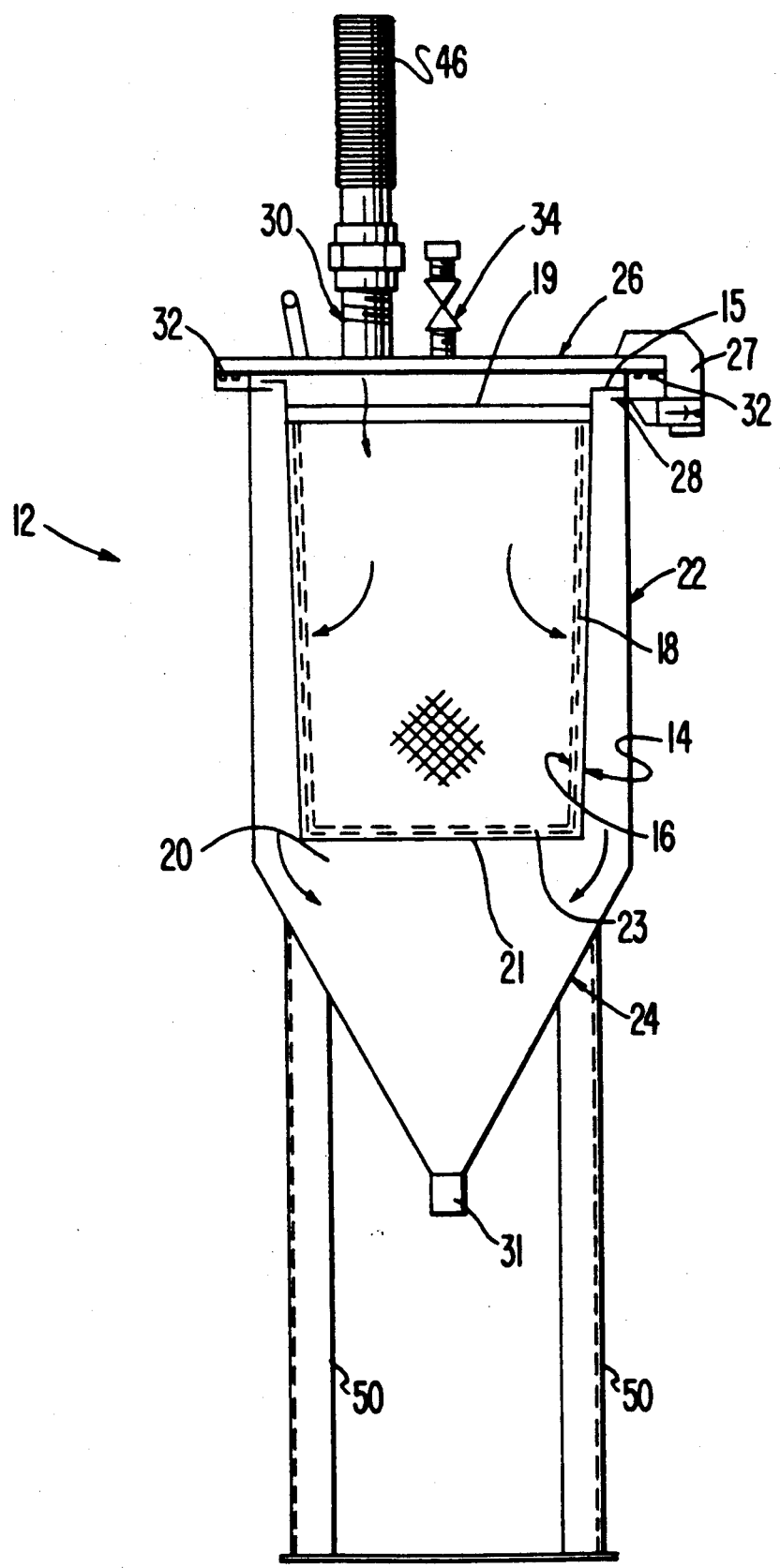
FIG. 3 is a sectional side view of the filter assembly of the present invention.

The preferred embodiment of the filtration unit of the present invention is shown in FIGS. 1, 2 and 4 and is represented generally by the numeral 10. The preferred embodiment of the filter assembly of the present invention is shown in FIG. 3 and is represented generally by the numeral 12. As can be seen from FIG. 1, filtration unit 10 can include two filter assemblies 12 and 12', although it is contemplated that filtration unit 10 can include only a single filter assembly. However, two filter assemblies permits more continuous operation of the filtration unit because one such filter assembly can be in operation while the other is being emptied.

In accordance with the present invention, the filter assembly includes a basket having a porous surface defining an interior space for collecting impurities filtered from a fluid, the basket surface having pores of a first average pore size. A filter liner of a second average pore size is disposed inside the basket for filtering impurities from the fluid, the second average pore size being less than the first average pore size. As embodied herein and as shown in FIG. 3, filter assembly 12 includes a porous basket 14 and a filter liner 16 disposed inside basket 14. Filter liner 16 has an average pore size less than the average pore size of basket 14.

The filter liner of the present invention can be either affixed to the porous basket or be removably disposed therein. As embodied herein and as shown in FIG. 3, basket 14 is a cylindrically shaped porous basket and filter liner 16 is a cylindrically shaped porous element that is removably disposed inside basket 14. Filter liner 16 loosely fits within basket 14 in close proximity to the basket surface and is not connected thereto. A small gap 23 of approximately 1/16 of an inch is formed between basket 14 and filter liner 16. The gap 23 between basket 14 and filter liner 16 should be small to minimize the amount of debris accumulating therein. Testing thus far has shown that the gap between the porous basket and the filter liner should be in the range of ¼ inch to 1/32 inch. The minimal amount of debris accumulating in this gap is not sufficient to blind off filter liner 16.

As further embodied herein and shown in FIG. 3, a porous liner of a third average pore size is affixed to the porous surface of basket 14. The third average pore size is intermediate the first and second average pore sizes of the basket and filter liner, respectively. In the preferred embodiment of the filter assembly, basket 14 has ¼ inch holes, filter liner 16 has 1/16 inch holes and porous liner 18 has ⅛ inch holes. The fluid flow of the unfiltered fluid is from the inside of basket 14 to the outside of basket 14. Thus, the filter assembly of the present invention includes a plurality of elements (16, 18 and 14) disposed with an increasing degree of average pore size in a direction of fluid flow, as opposed to the decreasing degree of average pore size in the direction of fluid flow that is shown in U.S. Pat. No. 3,349,919.

The amount of flow area (openings)/unit surface area of each of elements 16, 18 and 14 of filter assembly 12 has also been determined. Filter liner 16 has 101 in.$^2$/ft.$^2$, porous liner 18 has 110 in.$^2$/ft.$^2$ and basket 14 has 56.5 in.$^2$/ft.$^2$. Thus, the fluid flowing through filter assembly 12 will encounter an increase in porosity when going from filter liner 16 to porous liner 18 and a subsequent decrease in porosity when going from porous liner 18 to basket 14.

The overall structure of filter assembly 12 provides for an effective filtering system. The majority of filtering is done by filter liner 16. A small amount of filtering of fine particles is accomplished by porous liner 18 and basket 14. These elements capture some fine particles that flow through filter liner 16. The amount of debris captured by porous liner 18 and basket 14 is intended to be minimal to prevent blinding off of filter liner 16.

However, the presence of porous liner 18 and basket 14 improves the overall filtering efficiency of filter assembly 12 by adding structural support and by providing for more even distribution of the suctioning pressure applied for drawing fluid through the assembly. In effect, it is believed that porous liner 18 and basket 14 increase the effective surface area over which the suctioning pressure is distributed. This allows for a more even fluid flow through filter liner 16, thereby allowing the filter liner to filter more effectively. The result is a significantly improved filter assembly, as compared to using filter liner 16 alone.

Indeed, it has been found in certain sawmill applications that both porous liner 18 and basket 14 are necessary to provide effective filtering. Without both these elements positioned adjacent filter liner 16, the filter liner would repeatedly blind off and ineffectively filter the fluid. It is believed that the fibrous nature of debris from a sawmill dip tank involves unique properties requiring the structural elements of the present invention for effective filtering. Debris from paper and pulp mills is similarly fibrous in nature and is expected to involve problems in filtering similar to the problems encountered in filtering debris found in sawmill dip tanks.

Basket 14 should be sized to accommodate sufficient debris filtered from the dip tank solution to allow continuous filtering over an extended period of time. The filtering efficiency of filter assembly 12 improves as debris accumulates on filter liner 16. Debris smaller than 1/16 of an inch may initially pass through filter liner 16. However, a layer of debris will eventually begin to form on filter liner 16 that acts as a filtering aid. This layer of debris accumulating on the filter liner is porous to fluid but will catch very fine particles that may have initially passed through the filter liner. Because this layer of debris is porous to fluid, it does not act to blind off filter liner 16.

The preferred embodiment of filter basket 14 holds up to five gallons of debris. Filter basket 14 is preferably made of 14 gauge metal having ¼ inch circular holes. Filter liner 16 and porous liner 18 preferably have 1/16 and ⅛ inch holes, respectively, and can be comprised of a metal or a polymer. Preferably, porous liner 18 is metal and is tack welded to basket 14. Elements 14, 16 and 18 provide for removal of debris ranging from approximately 2 inches down to a few microns. In certain applications, only basket 14 and filter liner 16 are necessary to achieve the desired degree of filtering. In such instances, filter liner 16 can be connected to basket 14 or merely disposed in basket 14 in a loose fitting manner with a small gap 23 therebetween.

In accordance with the present invention, the filter assembly includes a canister surrounding basket 14. As embodied herein and shown in FIG. 3, filter assembly 12 includes canister 20 having straight sidewalls 22, a sloping bottom 24 and a lid 26. Preferably, canister 20 is metal and lid 26 is hinged to canister 20 by hinge 27. Lid 26 is sealed to canister 20 during operation of filter assembly 12 by dual O-rings 32 and four bolts (not shown). The suctioning of fluid through elements 14, 16 and 18 creates a vacuum in canister 20 that can be released through ⅜ ball valve 34 once basket 14 is filled with debris. The cone shaped canister bottom 24 and straight sidewalls 22 act to funnel the filtered fluid out of canister 20 via cylindrical exit throat 31 for return to the dip tank.

As shown in FIG. 3, canister 20 further includes an inwardly extending lip 28 adjacent the top end of sidewalls 22. Basket 14 includes an inwardly extending flange 15 adjacent a top end 19 thereof. Flange 15 rests upon lip 28 to support basket 14 in canister 20. The weight of basket 14 is sufficient to form a seal between flange 15 and lip 28 that prevents fluid from escaping basket 14 and being returned unfiltered to the dip tank. Debris is filtered on the walls and bottom of filter liner 16. The filtered fluid passes through the ¼ inch holes in basket 14 and is returned to the sawmill dip tank.

The trapping of filtered debris inside basket 14 allows for easy disposal of the debris. The diameter of the basket is preferably tapered from top to bottom. In the preferred embodiment of the filter assembly, basket 14 has a 13 inch diameter of the top 19 and a 12 inch diameter at the bottom 21. Basket 14 can be removed from canister 20 and the tapered design of basket 14 permits the debris to be dumped out easily. Empty basket 14 is then reinstalled in canister 20 with flange 15 resting on lip 28. Removal of full basket 14 can be accomplished by a power lift mechanism (not shown).

In accordance with the present invention, a nozzle is provided for supplying unfiltered fluid inside the porous basket and the filter liner. As embodied herein, filter assembly 12 includes nozzle 30 disposed in lid 26 of canister 20 for providing an unfiltered fluid inside basket 14 and filter liner 16. As shown in FIG. 1, nozzle 30 is offset from, and inclined at angle $\theta$ with respect to, the vertical axis of canister 20 for increasing the swirling intensity of the fluid inside the canister. Preferably, angle $\theta$ is 20°. The centrifugal force created by inclined nozzle 30 promotes filtration and dewatering of the debris inside the filter assembly. Additionally, the centrifugal force prevents the filter liner from becoming clogged.

In accordance with another aspect of the present invention, there is provided a filtration unit for filtering a wide size range of impurities from a fluid. As embodied herein and shown in FIGS. 1 and 2, filtration unit 10 includes filter assemblies 12 and 12' and pump 40. It is also contemplated that filtration unit 10 will include only a single filter assembly.

In the filtration unit 10 shown in FIG. 1, isolation valves 48 and 48' are provided at the bottom of filter assemblies 12 and 12', respectively, so that unfiltered fluid can be supplied at the operator's choice to either filter assembly 12 or filter assembly 12'. Isolation valves 48 and 48 are 1¼ inch metal ball valves. When isolation valve 48 is closed, pump 40 will suction unfiltered fluid through filter assembly 12', and when isolation valve 48' is closed, pump 40 will suction unfiltered fluid through filter assembly 12. Isolation valves 48 and 48' also ensure that the return flow of the filtered fluid is directed to pump 40.

It is not presently contemplated that filter assemblies 12 and 12' be used simultaneously. Rather, the pair of filter assemblies are provided so that, for instance, filter assembly 12 can be used while filter assembly 12' is being emptied. Such a system allows for more continuous operation of filtration unit 10. Filter assemblies 12 and 12' do, however, share a common pipe 38 for return of the filtered fluid to the dip tank.

Preferably, pump 40 is an air driven diaphragm pump. An air compressor 42 may be provided to supply the motive force for operating diaphragm pump 40. Air compressor 42 should be sized according to the air requirements of the pump being used. The power supply for air compressor 42 can be either an electric motor (not shown) or a gasoline driven engine (not shown). The capacity of pump 40 must be sufficient to provide enough suction to draw the unfiltered solution from a dip tank into the filter assembly and to pump the filtered solution back to the dip tank. It is desirable to have sufficient velocity on the filtered solution being returned to the dip tank to stir up debris in the tank and maintain it in suspension. A pump having a capacity in the range of 20–100 gallons per minute (gpm) is acceptable for standard dip tanks which contain 5000–10,000 gallons of solution. It has been found preferable to maintain a flow rate of approximately 70 gpm in the filtering process.

The filtration unit of the present invention is intended to be used at remote on-site sawmill locations. Accordingly, the entire filtration unit 10 is mounted on portable platform 44 which can be towed or otherwise transported. As best seen in FIG. 1, filter assemblies 12 and 12', pump 40 and air compressor 42 are all mounted on platform 44. Filter assemblies 12 and 12' are supported on platform 44 by support posts 50. Pump 40 and compressor 42 can be mounted on platform 44 by any conventional means.

Because air compressor 42 can be operated with a gasoline powered engine, it is possible to use filtration unit 10 at locations remote from an electrical power source. Furthermore, filtration unit 10 can be moved between locations with relative ease. These features, as well as the low capital costs associated with filtration unit 10, make the unit a practical solution to the problem of disposing of debris that accumulates in sawmill dip tanks. Furthermore, it is believed that the filter assembly of the present invention is especially effective for filtering fibrous type of debris such as that found in sawmill dip tanks.

The method of the present invention will now be described with reference to the accompanying drawings. The arrows in FIGS. 1 and 3 indicate the direction of fluid flow through filtration unit 10 and filter assembly 12, respectively.

First, air driven diaphragm pump 40 is operated by either compressor 42 or by a separate supply of air provided on-site. Air is provided to pump 40 through metal piping (not shown). Assuming isolation valve 48' is closed, the action of pump 40 draws fluid through a two inch reinforced polyvinyl chloride hose 46 from a sawmill dip tank (not shown) in which the opposite end of hose 46 is positioned. The opposite end of hose 46 can be weighted so that it remains submerged in the dip tank solution. The unfiltered fluid drawn through hose 46 enters filter assembly 12.

Fluid entering filter assembly 12 is directed to the interior of basket 14 by nozzle 30. The suctioning action of pump 40 draws the fluid through filter liner 16, porous liner 18 and basket 14, which are arranged in order of increasing pore size. The filtered impurities accumulate inside filter liner 16 and basket 14, while the filtered fluid escapes through the sides and bottom of the basket. Sidewalls 22 and bottom 24 of canister 20 act to funnel the filtered fluid out exit throat 31 to pipe 38 that leads to pump 40. The filtered fluid enters the chambers of pump 40 and is pumped back to the dip tank via return line 52. This method of filtration is advantageous because the pump is exposed only to a filtered fluid and is thus not likely to clog. Once basket 14 of filter assembly 12 is filled with debris, isolation valve 48' is opened and isolation valve 48 is closed. Pump 40 will now draw fluid via hose 46' through filter assembly 12' and basket 14 of filter assembly 12 can be removed and emptied. Basket 14 can be emptied by removing it from canister 20 and turning it upside down. Filter liner 16 will fall out with the debris if it is not affixed to basket 14. The filter liner can be easily cleaned by spraying it with a water hose and be placed inside basket 14 before the basket is reinstalled in canister 20.

The present invention is particularly designed to remove debris from a sawmill dip tank. This debris typically includes a wide size range of various impurities. An analysis of typical debris removed from a sawmill dip tank showed the following particle sizes:

| Particle Size (Range in Microns) | Percent by Weight |
|---|---|
| 1.0–2.5 | 0.01 |
| 2.5–5.0 | 0.01 |
| 5.0–15.0 | 0.01 |
| 15.0–25.0 | 0.10 |
| 25.0–50.0 | 14.20 |
| 50.0–100.0 | 26.20 |
| >100.0 | 59.50 |

Even with the wide range of particle sizes shown above, the filtration unit of the present invention can remove over 90 percent of the impurities from the dip tank solution when the solution is filtered on a regular basis.

Regular filtration according to the present invention of the sawmill dip tank solution allows for better utilization of the wood treatment chemical (less is absorbed by the debris) and for use of the debris as a filter in particle board. An analysis of dip tank debris was performed to determine the effect of time on the composition of the debris. The following chart illustrates the results of the compositional analysis:

| Elapsed Time for Debris in Dip Tank | Moisture % | Solids % | Average Chemical Treatment Parts Per Million (ppm) |
|---|---|---|---|
| 1 hour | 72.2 | 27.8 | 2,724 |
| 6 weeks | 71.2 | 28.8 | 67,555 |
| 1 year | — | — | 41,329 to 68,783 |

The above results show that continuous or regular filtration of the dip tank solution prevents significant accumulations of the treatment chemical in the debris. The solution in the dip tank averaged 1775 ppm of treatment chemical. Yet, debris remaining in the dip tank for a six-week period averaged 67,555 ppm of the treatment chemical. This indicates that a significant amount of treatment chemical is lost due to absorption by the debris. Regular or continuous filtration of the dip tank solution will prevent this unnecessary loss of treatment chemical. Furthermore, regular or continuous filtration will limit the concentration of treatment chemical in the debris. This prevents the debris from being classified as a hazardous waste and allows the debris to be used as a filler in particle board.

It will be apparent to those skilled in the art that various modifications and variations can be made in the filter assembly of the present invention without departing from the scope or spirit of the present invention. Thus, it is intended that the present invention cover the modifications and variations of the invention which come within the scope of the appended claims or their equivalents.

What is claimed is:

1. A filter assembly for filtering a wide size range of impurities from a fluid comprising:
    a basket having a porous surface defining an interior space for collecting impurities filtered from a fluid, said basket surface having a first average pore size;
    a filter liner of a second average pore size disposed inside said basket for filtering impurities from the fluid, said second average pore size being less than said first average pore size; and
    a canister surrounding the basket, said canister including a lid and a nozzle, said nozzle being disposed in the lid to provide unfiltered fluid inside the canister, said nozzle being offset and inclined with respect to the vertical axis of the canister for increasing the swirling intensity of the fluid inside the canister.

2. A filter assembly as recited in claim 1, wherein the filter liner is removably disposed inside the basket in close proximity to the basket surface thereby forming a gap between said porous basket surface and said filter liner.

3. A filter assembly as recited in claim 2, further comprising a porous liner of a third average pore size affixed to the basket surface and disposed between the basket and the filter liner, said third average pore size being intermediate said first and second average pore sizes.

4. A filter assembly as recited in claim 3, wherein the basket has ¼ inch pores, the filter liner has 1/16 inch pores and the porous liner has ⅛ inch pores.

5. A filter assembly as recited in claim 1, wherein said canister includes straight sidewalls and a sloping bottom forming a cone-shaped cross section.

6. A filter assembly as recited in claim 5, wherein the canister includes an inwardly extending lip adjacent a top end of the sidewalls and the basket includes an outwardly extending flange that rests upon said lip to support the basket in the canister.

7. A filter assembly as recited in claim 5, wherein the basket is tapered from top to bottom and is removable from the canister for disposing of the filtered impurities collected therein.

8. A filter assembly as recited in claim 1, wherein the filter liner is affixed to the basket surface.

9. A filter assembly as recited in claim 1, wherein the nozzle is inclined at a 20° angle with respect to the vertical axis of the canister.

10. A filtration unit for filtering a wide size range of impurities from a fluid comprising:
    a pump;
    a filter assembly including a basket having a porous surface defining an interior space for collecting impurities from a fluid, said basket surface having a first average pore size, and a filter liner of a second average pore size disposed inside said basket for filtering impurities from the fluid, said second average pore size being less than said first average pore size; and a canister surrounding the basket, said canister including a lid and a nozzle, said nozzle being disposed in the lid to provide unfiltered fluid inside the canister, said nozzle being offset and inclined with respect to the vertical axis of the canister for increasing the swirling intensity of the fluid inside the canister.

11. A filtration unit as recited in claim 10, wherein the pump is an air driven diaphragm pump.

12. A filtration unit as recited in claim 11, further comprising a portable platform on which the pump and filter assembly are mounted, said portable platform being transportable between on-site locations.

13. A filtration unit as recited in claim 12, further comprising an air compressor for supplying motive force for the diaphragm pump, said air compressor being mounted on the portable platform.

14. A filtration unit as recited in claim 10, comprising a plurality of filter assemblies and a common piping system for communicating filtered fluid to the pump.

15. A method of filtering a wide size range of impurities from a fluid comprising suctioning an unfiltered fluid through a basket having a porous surface of a first average pore size and a filter liner of a second average pore size less than said first average pore size, said unfiltered fluid being suctioned through a nozzle that is offset and inclined with respect to the vertical axis of the basket for increasing the swirling intensity of the fluid inside the basket, said filter liner being disposed inside said basket for filtering the fluid before the fluid exits the basket so that a pump will draw a substantially clean fluid.

16. A method as recited in claim 15, wherein the nozzle is inclined at a 20° angle with respect to the vertical axis of the basket.

17. A method as recited in claim 15, wherein the suctioning of the fluid through the filter liner and basket creates a vacuum.

* * * * *

UNITED STATES PATENT AND TRADEMARK OFFICE
CERTIFICATE OF CORRECTION

PATENT NO. : 5,032,293

DATED : JULY 16, 1991

INVENTOR(S) : GREGORY D. TUITE

It is certified that error appears in the above-identified patent and that said Letters Patent is hereby corrected as shown below:

Column 8

Claim 4, column 8, line 40, "½" should be --¼--.

Signed and Sealed this

Eighteenth Day of August, 1992

Attest:

DOUGLAS B. COMER

Attesting Officer

Acting Commissioner of Patents and Trademarks